(12) United States Patent
Shibuya et al.

(10) Patent No.: US 6,746,556 B2
(45) Date of Patent: Jun. 8, 2004

(54) METHOD FOR PRODUCING A PLATE-LIKE BODY ATTACHED WITH A RESIN FRAME

(75) Inventors: Yasuhiro Shibuya, Aiko-gun (JP); Toshihiro Atsumi, Chita-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 184 days.

(21) Appl. No.: 10/077,755

(22) Filed: Feb. 20, 2002

(65) Prior Publication Data

US 2002/0162619 A1 Nov. 7, 2002

(30) Foreign Application Priority Data

Feb. 21, 2001 (JP) ......................... 2001-045029

(51) Int. Cl.[7] .................. B60J 10/02; B60R 13/06
(52) U.S. Cl. ................... 156/107; 156/108; 156/244.11
(58) Field of Search .................. 156/107, 108, 156/244.11, 500; 52/204.595, 204.597; 296/201, 96.21; 277/921

(56) References Cited

U.S. PATENT DOCUMENTS

| | | |
|---|---|---|
| 4,839,122 A | 6/1989 | Weaver |
| 5,437,131 A | 8/1995 | Tamura |
| 5,693,174 A | 12/1997 | Nakata et al. |
| 5,795,421 A * | 8/1998 | Takahashi et al. .......... 156/108 |
| 5,897,937 A * | 4/1999 | Cornils et al. .............. 156/242 |

* cited by examiner

Primary Examiner—Jeff H. Aftergut
Assistant Examiner—Barbara J. Musser
(74) Attorney, Agent, or Firm—Oblon, Spivak, McClelland, Maier & Neustadt, P.C.

(57) ABSTRACT

A practically applicable plate-like body attached with a resin frame in which a thermoplastic elastomer is used as a resin material for the frame.

A molded product 7 of thermoplastic elastomer extruded from a molding die 6 is cooled to 100° C. or less; a lip portion of the molded product 7, an attached surface to be attached to the plate-like body 1, of the molded product 7 and a pressed surface of the molded product 7 are heated so that the temperature TL of the lip portion, the temperature TA of the attached surface and the temperature TO of the pressed surface have relations of TO<TL<TA and TA≧200° C., and then, the pressed surface is pushed whereby the molded product 7 is firmly attached to an outer peripheral portion of the plate-like body 1 by the aid of the attached surface.

10 Claims, 6 Drawing Sheets

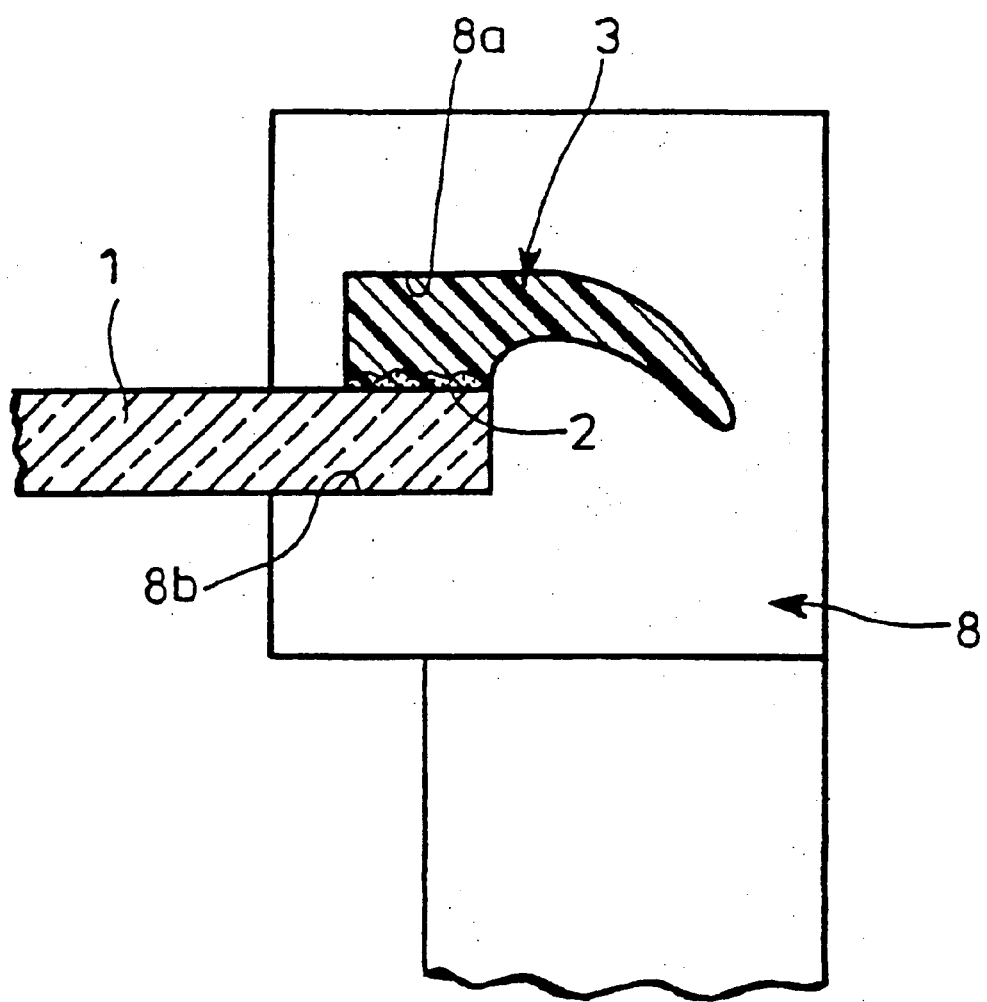

METHOD FOR PRODUCING A PLATE-LIKE BODY ATTACHED WITH A RESIN FRAME

The present invention relates to a method for producing a plate-like body attached with a resin frame (hereinbelow, referred to as a resin-frame-attached plate-like body) suitable for closing the space formed between a plate-like body used for a window of a vehicle or a building and a window opening of the vehicle or the building.

A resin-frame-attached plate-like body is fitted to a window opening of a vehicle or a building wherein a resin frame such as a molding, a gasket or the like made of synthetic resin which is for decorative purpose or improves sealing properties is attached to a peripheral portion of a plate-like body such as a glass sheet or a transparent resin plate.

FIG. 7 is a cross-sectional view showing an example of the resin-frame-attached plate-like body used for a window of a vehicle. This resin-frame-attached plate-like body is attached firmly with a resin frame 3 by an adhesive 2 on a surface (a car interior side surface) of a peripheral portion of a plate-like body 1 such as a glass sheet or a transparent resin plate. The resin frame 3 comprises a lip portion 3a projecting outwardly from the peripheral portion of the plate-like body, and the lip portion 3a performs a sealing function to the vehicle body 4.

As the method for producing the resin-frame-attached plate-like body shown in FIG. 7, there is the method as follows. FIG. 8 is a perspective view of an apparatus for producing the resin-frame-attached plate-like body shown in FIG. 7, and FIG. 9 is a view observed from an arrow mark direction of IX–IV in FIG. 8. The apparatus comprises an extrusion machine 5. A resin material for a resin frame is extruded through a molding die 6 of the extrusion machine 5 into a predetermined shape in cross section whereby a molded product 7 for the resin frame is once formed. Then, the molded product 7 is supplied to a cavity portion 8a in a pressing member 8. Further, a peripheral portion of a plate-like body 1 supported by a driving robot 10 with sucking disks 9 is inserted into a plate-like body insertion opening 8b in the pressing member 8. In this case, an adhesive 2 is previously applied onto a surface (an upper surface in FIG. 8) of the peripheral portion of the plate-like body 1. Such molded product 7 is press-bonded to the plate-like body 1 by the pressing member 8. Accordingly, when the plate-like body 1 is moved with respect to the pressing member 8 in this state, the molded product 7 is attached firmly to the surface of the peripheral portion of the plate-like body 1 by the adhesive 2, whereby a resin frame 3 is formed.

Polyvinyl chloride has conventionally been used as a resin material for the frame of the molded product 7, which is used when the above-mentioned resin-frame-attached plate-like body is produced. However, there has been requested to use a material other than the polyvinyl chloride as the resin material for the frame in recent years. According to such request, the inventors of this application have made extensive studies of using a thermoplastic elastomer, in particular, an olefin type thermoplastic elastomer as the resin material for the frame. The thermoplastic elastomer is a polymeric material showing rubber elasticity at the room temperature but being plasticized at a high temperature and capable of molding. Namely, it has a function of distortion recovery by mainly physical cross-linking at the room temperature. However, it shows thermal plasticity at a high temperature because the cross-linking portion is temporarily lost, and shows rubber elasticity when it is cooled. However, in the case of using the thermoplastic elastomer as the resin material for the frame, when the molded product 7 is formed and it is attached firmly to a corner portion of the plate-like body 1, a tensile force is generated in the molded product 7 in a bending operation, with the result that the molded product 7 is broken.

It is an object of the present invention to provide a method for producing a practically applicable plate-like body attached with a resin frame, which eliminates a possibility that the molded product is broken or the molded product is curved in a thickness direction of the plate-like body even when a thermoplastic elastomer is used as the resin material for the frame of the resin-frame-attached plate-like body to form the molded product, and even when the molded product is attached to a corner portion of the plate-like body.

According to the present invention, there is provided a method for producing a plate-like body attached with a resin frame, wherein a molded product is formed by extruding through a molding die a resin material for a resin frame into a predetermined shape in cross section; the molded product is pushed to at least one surface of a peripheral portion of the plate-like body for a window, and the resin frame having a lip portion for sealing the space between the plate-like body and a window opening to which the plate-like body is attached is integrated with the peripheral portion of the plate-like body, the method for producing a plate-like body attached with a resin frame being characterized by comprising:

using a thermoplastic elastomer as a resin material for the frame, and conducting an extrusion process for extruding the resin material for a resin frame through a molding die to form a molded product; a cooling process for cooling the formed molded product to not more than 100° C.; a heating process for heating a lip portion, an attached surface to be attached to the plate-like body, of the molded product, and the surface of the molded product which is opposite to the attached surface so that the temperature TL of the lip portion, the temperature TA of the attached surface and the temperature TO of the surface opposite to the attached surface have relations of TO<TL<TA and TA≧200° C., and a press-bonding process for putting the molded product into a cavity portion in a pressing member disposed at a predetermined distance apart from the molding die; inserting a peripheral portion of the plate-like body into a plate-like body insertion opening of the pressing member, and press-bonding the molded product to the peripheral portion of the plate-like body while the pressing member is moved relatively to the plate-like body along the peripheral portion of the plate-like body, wherein these processes are conducted in the order of the extrusion process—cooling process—heating process—press—bonding process, whereby the resin frame is formed integrally with the peripheral portion of the plate-like body.

In the present invention, it is desirable that in the cooling process, the temperature TL of the lip portion is not more than 50° C., and the temperatures TA of the attached surface and the temperature TO of the surface opposite to the attached surface are not more than 100° C.

Further, in the present invention, it is desirable that in the heating process, the temperature TL of the lip portion is from 100° C. to 200° C., and the temperature TA of the attached surface 7b is from 200° C. to 300° C. and the temperature TO of the surface opposite to the attached surface 7b is not more than 130° C.

In the present invention, when the molded product made of the thermoplastic elastomer extruded through the molding die is once cooled to not more than 100° C. to provide the elasticity as rubber, the elasticity as rubber is not lost even though it is heated thereafter. Accordingly, even when the thermoplastic elastomer is used for the resin frame and the resin frame is attached firmly to a corner portion of the plate-like body, the molded product does not break even when a tensile force is generated in the molded product in its longitudinal direction in the bending operation. Further, in the present invention, the attached surface to be attached to the plate-like body, of the molded product is heated to a higher temperature than the other portion, and is softened. Therefore, the attached surface can be attached well to the plate-like body. Further, in the present invention, the lip portion of the molded product is heated to a higher temperature than the surface which is opposite to the attached surface of the molded product, and is softened. Accordingly, when a tensile force is generated in the lip portion in its longitudinal direction by bending the molded product at a corner portion of the plate-like body, the lip portion can extend easily in its longitudinal direction. Therefore, there is little possibility that the lip portion is curved in a thickness direction of the plate-like body at the corner portion of the plate-like body.

In drawings:

FIG. 9 is a view observed from an arrow mark direction of IX—IX in FIG. 8.

In the following, preferred embodiments and examples of the present invention will be described with reference to the drawings.

Figure 1:
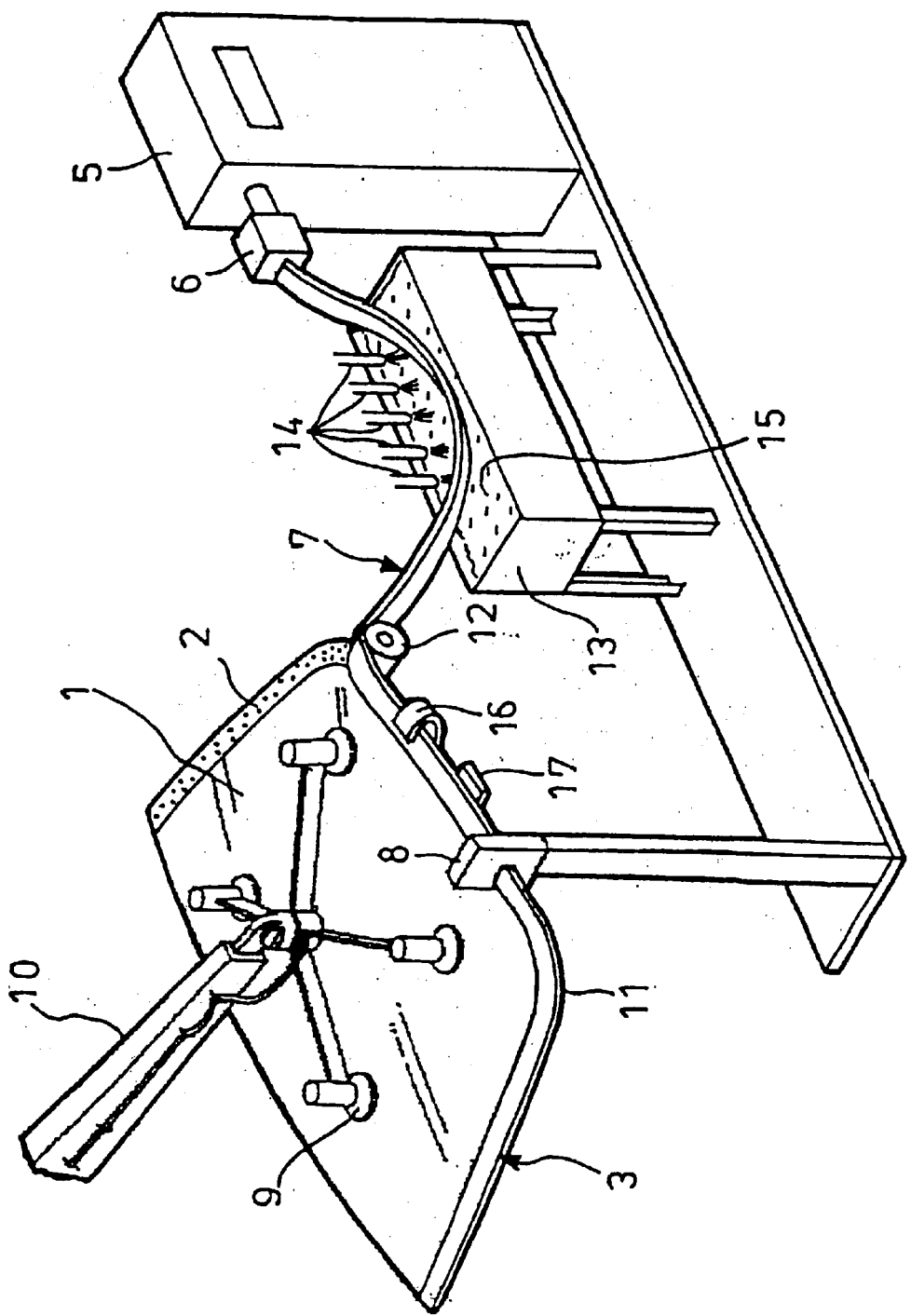
FIG. 1 is a perspective view showing an example of an apparatus for carrying out the method for producing the resin-frame-attached plate-like body according to the present invention.
Figure 2:
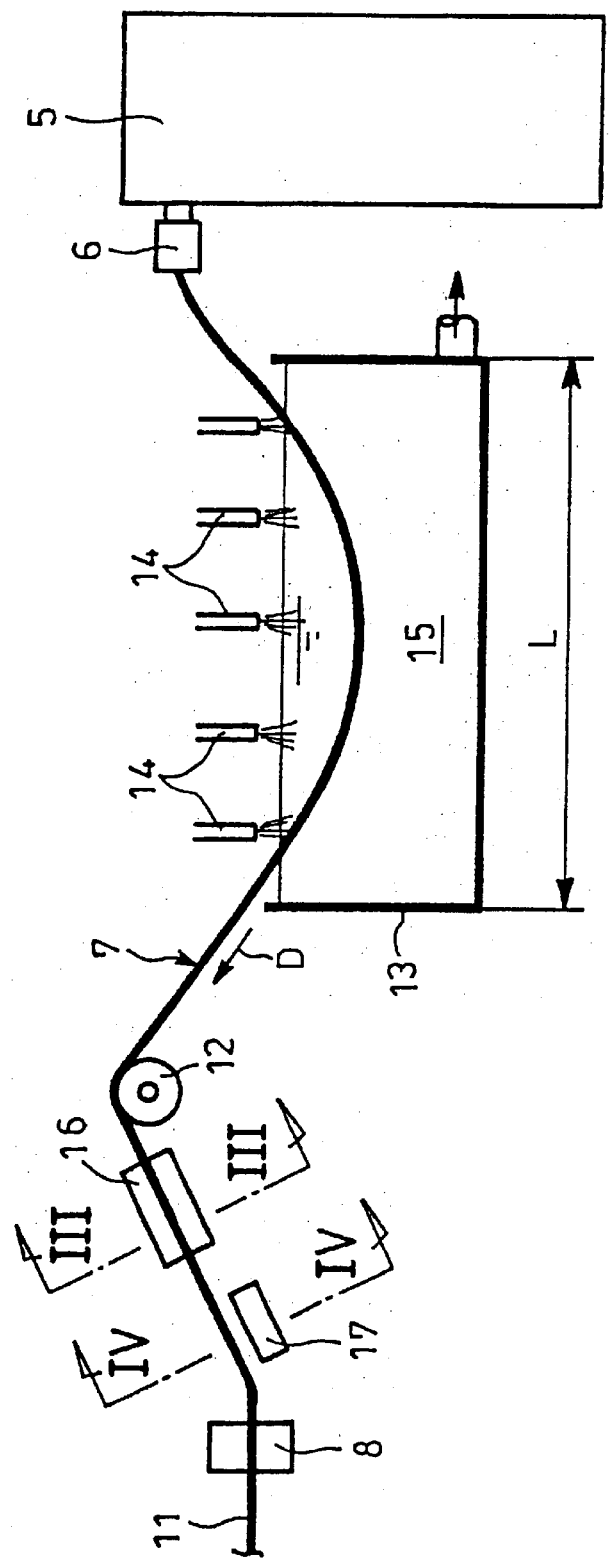
FIG. 2 is a side view showing an example of the apparatus for carrying out the method for producing the resin-frame-attached plate-like body according to the present invention.
Figure 3:
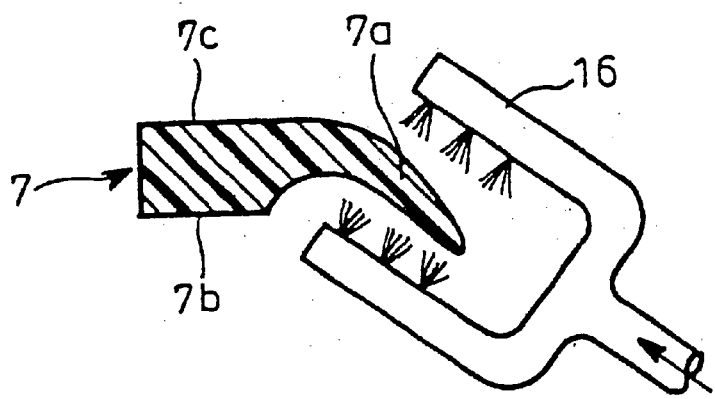
FIG. 3 is a view observed from an arrow mark direction of III—III in FIG. 2.
Figure 4:
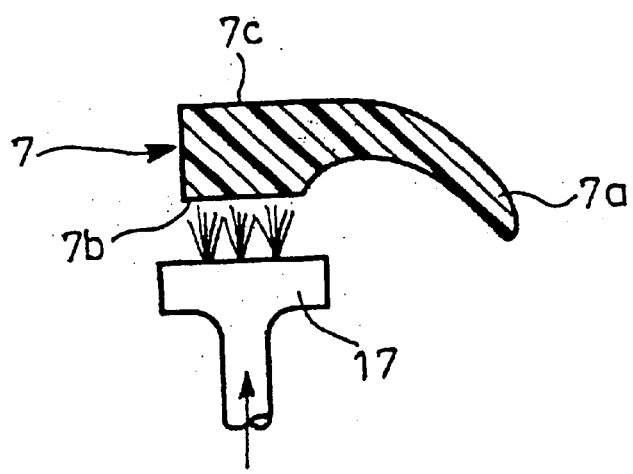
FIG. 4 is a view observed from an arrow mark direction of IV—IV in FIG. 2.

FIGS. 1 to 4 show an example of carrying out the present invention wherein FIG. 1 is a perspective view of an apparatus for producing a resin-frame-attached plate-like body; FIG. 2 is a side view of the apparatus for producing the resin-frame-attached plate-like body; FIG. 3 is a view observed from an arrow mark direction of III—III in FIG. 2, and FIG. 4 is a view observed from an arrow mark direction of IV—IV in FIG. 2.

Figure 8:
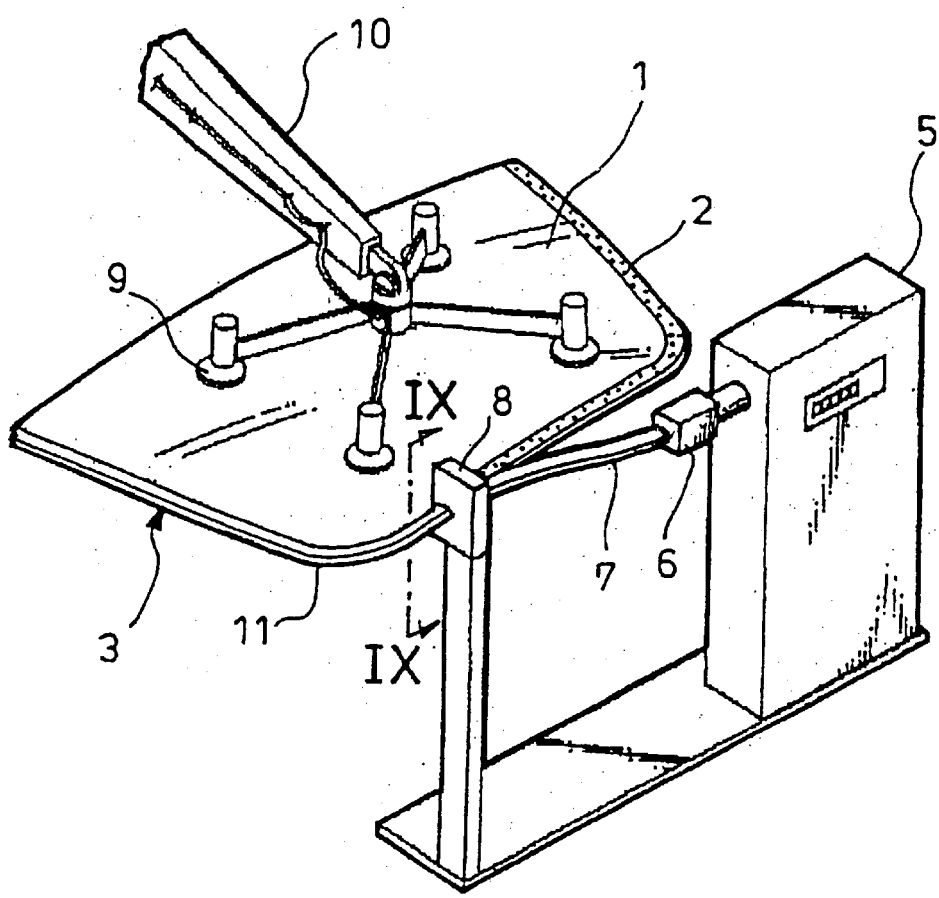
FIG. 8 is a perspective view of an apparatus for producing the resin-frame-attached plate-like body shown in FIG. 7.

An extrusion machine 5 comprises a molding die 6 for extruding a resin material for the frame in a predetermined shape in cross section. A molded product 7 formed by extruding the resin material for the frame through the molding die 6 is press-bonded to a peripheral portion of a plate-like body 1 by means of a pressing member 8. The plate-like body 1 is supported by sucking disks 9 of a driving robot 10. The driving robot 10 drives the plate-like body 1 so that the peripheral portion of the plate-like body 1 can be moved along the pressing member 8. The arrangement of the plate-like body 1 and the molded product 7 at the pressing member 8 is the same as that of the conventional technique (FIG. 8).

In the example shown in the figures, a guide roller 12 is disposed between the molding die 6 of the extruding machine 5 and the pressing member 8 so as to guide the molded product 7, in a slackened state, which is extruded through the molding die 6 of the extrusion machine 5, and is supplied to the pressing member 8. Between the molding die 6 of the extrusion machine 5 and the guide roller 12, a water bath 13 for cooling the molded product 7 is disposed. Above the water bath 13, a plurality of spraying nozzles 14 are arranged at predetermined intervals so that each of the nozzles is orientated to a transporting direction D of the molded product 7. The spraying nozzles 14 spray water 15, cooled in a water cooling system, toward an upper surface of the molded product 7 which moves in the water bath 13, and the water 15 in the water bath 13 can be controlled to a predetermined temperature.

Between the guide roller 12 and the pressing member 8, a lip portion heating device 16 for heating a lip portion of the molded product 7 and a attached surface heating device 17 are arranged in this order from an upstream side to a downstream side in the transporting direction D of the molded product 7. The lip portion heating device 16 is to heat the lip portion 7a of the molded product 7, which extends from once side to the other side of the molded product 7. The lip portion heating device 16 is provided with nozzles which oppose front and rear surfaces of the lip portion 7a of the molded product 7 so that the lip portion 7a is heated by blowing hot air through the nozzles as shown in FIG. 3. As shown in FIG. 4, the attached surface heating device 17 is to heat an attached surface 7b of the molded product 7, which is the surface to be attached firmly to the plate-like body 1. The attached surface heating device 17 is disposed to face the attached surface 7b of the molded product 7 to heat the attached surface 7b by blowing hot air through its nozzles. In FIGS. 3 and 4, reference numeral 7c designates a surface of the molded product 7, which is at an opposite side to the attached surface 7b of the molded product 7, and the surface 7c serves as a pressed surface of the molded product 7, which is pushed to the plate-like body 1 when the molded product 7 passes through the pressing member 8.

Next, the operations of the example shown in the figures will be described.

Extrusion Process

A resin material for the frame, composed of a thermoplastic elastomer is extruded through the molding die 6 into a predetermined shape in cross section to form the molded product 7. In this case, it is preferable that the extrusion rate of the molded product 7 is 1–10 m/min, more preferably, 3–5 m/min. The extrusion temperature of the resin material for the frame is preferably from 150° C. to 250° C., more preferably, from 160° C. to 220° C.

Cooling Process

The extruded molded product 7 is fed into the water bath 13 in a downwardly slackened state. The molded product 7 is cooled to 100° C. or lower by the water 15 in the water bath 13 and the water sprayed to an upper surface (the pressed surface 7c) of the molded product 7 through the spraying nozzles 14. The reason that the molded product 7 is cooled to not more than 100° C. is that the molded product does not lose the elasticity as rubber even when it is heated in a post-process, and the possibility of the breaking of the molded product 7 is reduced even when a tensile strength is generated in the molded product 7 when it is attached to the plate-like body 1 and is bent at a corner portion of the plate-like body 1. Further, the reason that the molded product 7 is cooled by the water 15 sprayed through the spraying nozzles 14 in addition to being cooled by the water 15 in the water bath 13 is that the entirety of the molded product 7 can be cooled effectively.

The water 15 of the spraying nozzles 14 is sprayed after it has been cooled in the water cooling system. The temperature of the water 15 in the water bath 13 is controlled to be from 0° C. to 20° C., preferably, about 8° C. Further, in order to cool the molded product 7 to not more than 100° C., the length L of the water bath 13 is determined appropriately in consideration of the extrusion rate of the molded product 7 and the water temperature of the water bath 13. The length L is preferably 400 to 1,000 mm.

Heating Process

The molded product 7 cooled in and fed from the water bath 13 is guided by the guide roller 12 and supplied to the lip portion heating device 16. Then, the lip portion 7a of the molded product 7 is heated by hot air discharged from the lip portion heating device 16. It is preferable to heat the lip portion 7a in a temperature range of 100–200° C. in the heating process. In order to keep the temperature TL of the lip portion 7a to 100–200° C., the temperature of the hot air discharged from the lip portion heating device 16 is preferably about 500° C. The molded product 7 with the heated lip portion 7a is delivered from the lip portion heating device 16 to the attached surface heating device 17. A lower surface (the attached surface 7b) of the molded product 7 is heated by hot air discharged from the attached surface heating device 17. The temperature TA of the attached surface 7b is preferably heated to 200–300° C. In order to maintain the temperature TA of the attached surface 7b at 200–300° C., the temperature of the hot air discharged from the attached surface heating device 17 is preferably about 500° C.

Although the upper surface (the pressed surface 7c) of the molded product 7 is not heated by applying hot air, the temperature TO of the pressed surface 7c (the surface opposite to the attached surface 7b) becomes about 50–130° C. as a result of the heating to the lip portion 7a and the attached surface 7b. Thus, the relations among the temperature TO of the pressed surface 7c, the temperature TL of the lip portion 7a and the temperature TA of the attached surface 7b of the molded product 7 after the heating are expressed by TO<TL<TA and TA≧200° C.

Figure 6:
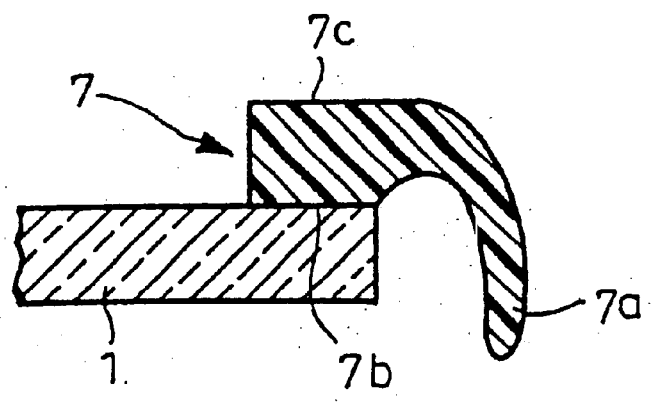
FIG. 6 is a cross-sectional view of the molded product attaching portion in a case that the attaching of the molded product to the plate-like body is not conducted well.
Figure 7:
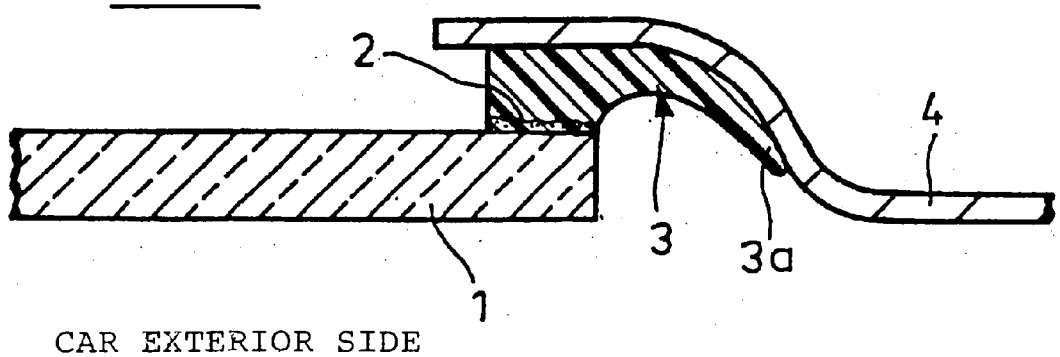
FIG. 7 is a cross-sectional view showing an example of the resin-frame-attached plate-like body used for a window of a vehicle.

The reason that the temperature TL of the lip portion 7a of the molded product 7 is heated to a higher temperature than the temperature TO of the pressed surface 7c to soften the lip portion 7a is as follows. The lip portion 7a is prevented from extending easily in, in particular, its longitudinal direction, when the molded product 7 is attached firmly to a corner portion 11 of the plate-like body 1 as shown in FIG. 1, and from curving toward the plate-like body 1 in a thickness direction of the plate-like body 1. Namely, the lip portion 7a is prevented from curving at the corner portion 11 of the plate-like body 1 as shown in FIG. 6 as explained with reference to FIG. 6 later. Further, the reason that the attached surface 7b is heated to the highest temperature is that the adhesive power of the molded product 7 to the plate-like body 1 is increased by increasing the viscosity.

Press-bonding Process

After the molded product 7 has been passed through the lip portion heating device 16 and the attached surface heating device 17 during which the lip portion 7a is heated by the lip portion heating device 16 and the attached surface 7b is heated by the attached surface heating device 17, the molded product is fed to the pressing member 8. Then, the molded product 7 is attached firmly to an outer circumferential portion of the plate-like body 1 by the aid of the adhesive 2 in the pressing member 8 in the same manner as described concerning the conventional technique.

As described before, when the molded product 7 of the thermoplastic elastomer extruded through the molding die 6 of the extrusion machine 5 is once cooled to not more than 100° C., it has the elasticity as rubber, and the elasticity as rubber is not lost even when it is heated thereafter. Accordingly, in the case that the thermoplastic elastomer is used for the resin frame 3 attached firmly to the plate-like body 1, there is little possibility that the molded product 7 is broken even when a tensile force is generated the molded product 7 by bending it at the corner portion 11. Accordingly, the practical applicability of the molded product 7 of thermoplastic elastomer is possible.

Further, when the molded product 7 is attached firmly to the corner portion 11 of the plate-like body 1 as shown in FIG. 1, the bent portion in the lip portion 7a can easily be extended in a longitudinal direction sine there are the relations of TO<TL<TA and TA≧200° C. as described before. Accordingly, the lip portion 7a does not curve toward the plate-like body 1 in its thickness direction. Further, as understood that the relations of TO<TL<TA and TA≧200° C. are established, the temperature TA of the attached surface 7b of the molded product 7 is heated at a higher temperature, specifically, 200° C. or more, than the lip portion 7a or the pressed surface 7c of the molded product 7. Accordingly, the adhesive power of the attached surface 7b of the molded product 7 to the plate-like body 1 can be improved.

Figure 5:
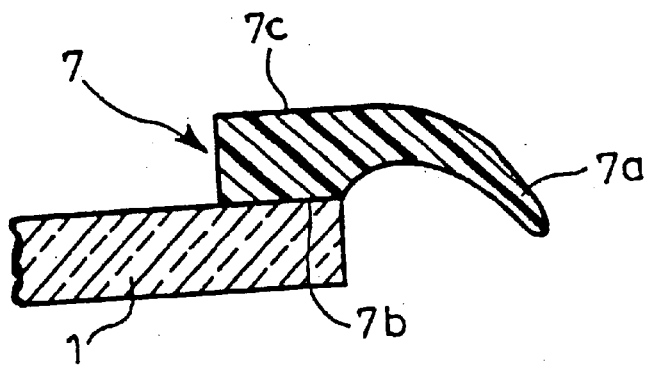
FIG. 5 is a cross-sectional view of a molded product attaching portion in a case that the attaching of the molded product to the plate-like body is conducted well.

The inventors of this application have made various experiments under various conditions in order to verify the effect of the present invention. Experimental results will be explained with reference to FIGS. 5 and 6. FIG. 5 is a cross-sectional view of the molded product attaching portion in a case that the attachment of the molded product to a corner portion of the plate-like body has been conducted well, and FIG. 6 is a cross-sectional view of the molded product attaching portion in a case that the attachment of the molded product to the corner portion of the plate-like body has not been conducted well.

EXAMPLE 1

In this Example, verification was made as to in what manner the molded product 7 was attached firmly to the plate-like body 1 when the molded product 7 extruded through the molding die 6 was cooled and heated according to the description concerning the above-mentioned figures. The temperature of each portion of the molded product 7 at the outlet of the molding die 6, the outlet of the water bath 13, the outlet of the lip portion heating device 16, and the outlet of the attached surface heating device 17 was measured, and the shape of the molded product 7 after it was firmly attached to the plate-like body 1 was observed under the conditions that a glass sheet was used for the plate-like body 1; a thermoplastic elastomer was used for the resin material for the frame; the extrusion rates of the molded product 7 extruded through the extrusion machine 5 were 3 m/min and 5 m/min; air temperature was 23° C.; the apparatus as shown in FIGS. 1 and 2 was used for carrying out the processes; the amount of water sprayed through the spraying nozzles 14 was 1 l/min; the length L of the water bath 13 was 600 mm and the hot air temperature from the lip portion heating device 16 and the attached surface heating device 17 was 500° C.

As a result of the temperature measurement, each temperature was as in 1—1 in Table 1 when the extrusion rate of the molded product 7 was 3 m/min and 1–2 in Table 1 when the extrusion rate of the molded product 7 was 5 m/min. The lip portion 7a of the molded product 7 did not curve toward the plate-like body 1 in a direction of the thickness due to a tensile force in its longitudinal direction at the corner portion 11 at the time of bending, and the molded product 7 could be attached firmly to the plate-like body 1 in a preferable state as shown in FIG. 5. In Table 1, TL1 indicates the temperature of the lip portion 7a of the molded product 7 at the outlet of the molding die 6; TO1 indicates the temperature of the pressed surface 7c of the molded product 7 at the outlet of the molding die 6; TA1 indicates the temperature of the attached surface 7b of the molded product 7 at the outlet of the molding die 6; TL2 indicates the temperature of the lip portion 7a of the molded product 7 at the outlet of the water bath 13; TO2 indicates the temperature of the pressed surface 7c of the molded product 7 at the outlet of the water bath 13; TA2 indicates the temperature of the attached surface 7b of the molded product 7 at the outlet of the water bath 13; TL3 indicates the temperature of the lip portion 7a of the molded product 7 at the outlet of the lip portion heating device 16; TO3 indicates the temperature of the pressed surface 7c of the molded product 7 at the outlet of the attached surface heating device 17; and TA3 indicates the temperature of the attached surface 7b of the molded product 7 at the outlet of the attached surface heating device 17. In both cases that the extrusion rates of the molded product 7 are 3 m/min and 5 m/min, the relations of TO3<TL3<TA3 and TA3≧200° C. are established at the outlets of the lip portion heating device 16 and the attached surface heating device 17.

EXAMPLE 2

In this Example, verification was made as to whether or not the molded product 7 extruded through the molding die 6 could be attached firmly to the plate-like body 1 without subjecting to the cooling process and the heating process. The temperature of each portion of the molded product 7 at the outlet of the molding die 6 was measured, and the shape of the molded product 7 after the molded product 7 was attached firmly to the plate-like body was observed in the same manner as Example 1 except that the molded product 7 was not subjected to the cooling process and the heating process. As a result of the temperature measurement, each temperature was as in 2–1 in Table 1 when the extrusion rate of the molded product 7 was 3 m/min, and was as 2—2 in Table 1 when the extrusion rate of the molded product 7 was 5 m/min. Further, the molded product 7 was broken at the corner portion 11 of the plate-like body 1, and it could not be attached to the plate-like body 1.

EXAMPLE 3

In this Example, verification was made as to how the molded product 7 attached firmly to the plate-like body 1 was when the molded product 7 extruded through the molding die 6 was cooled, and the pressed surface 7c was heated while the lip portion 7a was not heated. The temperature of each portion of the molded product 7 at the outlet of the molding die 6, the outlet of the water bath 13, the outlet of the lip portion heating device 16 and the outlet of the attached surface heating device 17 was measured, and the shape of the molded product 7 after the molded product 7 was attached firmly to the plate-like body was observed, in the same manner as Example 1 except that the lip portion 7a was not heated. As a result of the temperature measurement, each temperature was as in 3–1 in Table 1 when the extrusion rate of the molded product 7 was 3 m/min, and as in 3–2 in Table 1 when the extrusion rate of the molded product 7 was 5 m/min. The temperature at the outlet of the attached surface heating device 17 indicated TL3<TO3<TA3 and TA3≧200° C. At the corner portion 11 of the plate-like body 1, the softness of the lip portion 7a was insufficient, and it did not extend sufficiently when stretched in its longitudinal direction. The lip portion 7a was curved toward a side of the plate-like body 1 in a direction of the thickness of the plate-like body 1 due to a tensile force in the longitudinal direction, as shown in FIG. 6, and a preferable result was not obtained.

In view of these Examples 1, 2 and 3, it is understood that the relations of the temperature of each portions of the molded product 7 extruded through the molding die 6 in a case that the molded product 7 is cooled and then, heated, are desirably TO<TL<TA and TA≧200° C. It is supposed that a lower temperature of the lip portion 7a which has been subjected to cooling operation in the water bath 13, is because the wall thickness of the lip portion 7a is smaller than that of the other portion.

TABLE 1

| | Temperature (° C.) at the outlet of the molding die 6 | | | Temperature (° C.) at the outlet of the water bath 13 | | | Temperature (° C.) at the outlet of the lip portion heating device 16 or the attached surface heating device 17 | | |
|---|---|---|---|---|---|---|---|---|---|
| | TL1 | TO1 | TA1 | TL2 | TO2 | TA2 | TL3 | TO3 | TA3 |
| 1-1 | 178 | 177 | 179 | 24 | 26 | 67 | 195 | 104 | 271 |
| 1-2 | 180 | 180 | 182 | 30 | 43 | 98 | 157 | 102 | 270 |
| 2-1 | 177 | 177 | 179 | — | — | — | — | — | — |
| 2-2 | 180 | 180 | 181 | — | — | — | — | — | — |
| 3-1 | 177 | 177 | 179 | 25 | 28 | 72 | 40 | 55 | 261 |
| 3-2 | 180 | 184 | 181 | 31 | 41 | 100 | 48 | 102 | 241 |

It should be understood that the method for producing the resin-frame-attached plate-like body of the present invention is not limited to the Examples described in this specification, but various modifications can be made within the range of the present invention. For example, as the plate-like body used in the present invention, such one used for a window for a vehicle or a building, such as a single glass sheet, a lamination glass in which a transparent synthetic resin film is laminated in or on a glass sheet, a complex layer glass and so on can be selected appropriately and used depending on a way of use. Further, such glass sheet may be subjected to a bending operation, a tempering treatment or functional coating. Further, other than the glass sheet, a transparent resin plate called an organic glass or a laminated body of such organic glass with a glass sheet can be employed.

As described above, according to the method for producing the resin-frame-attached plate-like body described in claims 1 to 10 of the present invention, it is little possibility that the resin frame of thermoplastic elastomer is broken even when there is a tensile force due to a bending force at a corner portion of the plate-like body or it is curved toward the plate-like body at the corner portion. Accordingly, the resin frame of thermoplastic elastomer is practically usable and provides an excellent effect.

The entire disclosure of Japanese Patent Application No. 2001-045029 filed on Feb. 21, 2001 including specification, claims, drawings and summary are incorporated herein by reference in its entirety.

What is claimed is:

1. A method for producing a plate-like body attached with a resin frame in a continuous process, wherein a molded product is formed by extruding through a molding die a resin material for a resin frame into a predetermined shape in cross section; the molded product is pushed to at least one surface of a peripheral portion of the plate-like body for a window, and the resin frame having a lip portion for sealing the space between the plate-like body and a window opening to which the plate-like body is attached is integrated with the peripheral portion of the plate-like body, the method for producing a plate-like body attached with a resin frame being characterized by comprising:

using a thermoplastic elastomer as a resin material for the frame, and conducting an extrusion process for extruding the resin material for a resin frame through a molding die to form a molded product; a cooling process for cooling the formed molded product to not more than 100° C.; a heating process for separately heating a lip portion, an attached surface to be attached to the plate-like body, of the molded product, and the surface of the molded product which is opposite to the attached surface so that the temperature TL of the lip portion, the temperature TA of the attached surface and the temperature TO of the surface opposite to the attached surface have relations of TO<TL<TA and TA≧200° C., and a press-bonding process for putting the molded product into a cavity portion in a pressing member disposed at a predetermined distance apart from the molding die; inserting a peripheral portion of the plate-like body into a plate-like body insertion opening of the pressing member, and press-bonding the molded product to the peripheral portion of the plate-like body while the pressing member is moved relatively to the plate-like body along the peripheral portion of the plate-like body, wherein these processes are conducted in the order of the extrusion process—cooling process—heating process—press—bonding process, whereby the resin frame is formed in a continuous process integrally with the peripheral portion of the plate-like body.

2. The method for producing a plate-like body attached with a resin frame according to claim 1, wherein in the cooling process, the temperature TL of the lip portion is not more than 50° C., and the temperature TA of the attached surface and the temperature TO of the surface opposite to the attached surface are not more than 100° C.

3. The method for producing a plate-like body attached with a resin frame according to claim 1, wherein the temperature TL of the lip portion is from 100° C. to 200° C., and the temperature TA of the attached surface is from 200° C. to 300° C. and the temperature TO of the surface opposite to the attached surface is not more than 130° C.

4. The method for producing a plate-like body attached with a resin frame according to claim 1, wherein in the extrusion process, the extrusion rate of the molded product is from 1 m/min to 10 m/min.

5. The method for producing a plate-like body attached with a resin frame according to claim 1, wherein in the cooling process, the molded product is cooled by immersing the molded product in a water bath.

6. The method for producing a plate-like body attached with a resin frame according to claim 1, wherein in the cooling process, water cooled in a water cooling system is sprayed into a water bath.

7. The method for producing a plate-like body attached with a resin frame according to claim 1, wherein in the cooling process, the temperature of a water bath for cooling the molded product is from 0° C. to 20° C.

8. The method for producing a plate-like body attached with a resin frame according to claim 1, wherein in the heating process, the lip portion is heated by hot air discharged from a lip portion heating device.

9. The method for producing a plate-like body attached with a resin frame according to claim 1, wherein in the heating process, a lip portion heating device heats both front and rear surfaces of the lip portion simultaneously by blowing hot air from nozzles which are provided so as to oppose the front and rear surfaces of the lip portion.

10. The method for producing a plate-like body attached with a resin frame according to claim 1, wherein in the heating process, the attached surface is heated by hot air discharged from an attached surface heating device.

* * * * *